(12) United States Patent
Zhang et al.

(10) Patent No.: US 10,956,990 B2
(45) Date of Patent: Mar. 23, 2021

(54) METHODS AND APPARATUSES FOR ADJUSTING THE DISTRIBUTION OF PARTITIONED DATA

(71) Applicant: Alibaba Group Holding Limited, Grand Cayman (KY)

(72) Inventors: Haiyong Zhang, Hangzhou (CN); Jing Lu, Hangzhou (CN); Wenhui Yao, Hangzhou (CN); Chengyu Dong, Hangzhou (CN); Jiaji Zhu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 322 days.

(21) Appl. No.: 15/780,380

(22) PCT Filed: Dec. 16, 2016

(86) PCT No.: PCT/CN2016/110238
§ 371 (c)(1),
(2) Date: May 31, 2018

(87) PCT Pub. No.: WO2017/114178
PCT Pub. Date: Jul. 6, 2017

(65) Prior Publication Data
US 2018/0357727 A1    Dec. 13, 2018

(30) Foreign Application Priority Data
Dec. 30, 2015   (CN) .......................... 201511024615.9

(51) Int. Cl.
*G06Q 40/00* (2012.01)
*G06F 16/13* (2019.01)
(Continued)

(52) U.S. Cl.
CPC ......... *G06Q 40/125* (2013.12); *G06F 16/122* (2019.01); *G06F 16/13* (2019.01); *G06F 16/182* (2019.01); *G06F 16/278* (2019.01)

(58) Field of Classification Search
CPC . G06F 1/32; G06F 15/173; G06F 9/46; G06F 12/00; G06F 17/30; G06F 17/00; G06F 13/10
(Continued)

(56) References Cited

U.S. PATENT DOCUMENTS 6,324,620 B1 * 11/2001 Christenson ............ G06F 3/061
710/74
7,036,140 B2    4/2006 Hales et al.
(Continued)

FOREIGN PATENT DOCUMENTS

| CN | 102150150 A | 8/2011 |
|---|---|---|
| CN | 102414673 A | 4/2012 |
| CN | 104932956 A | 9/2015 |

OTHER PUBLICATIONS

International Search Report to International Application No. PCT/CN2016/110238 dated Mar. 16, 2017 (2 pages).

*Primary Examiner* — Olusegun Goyea
(74) *Attorney, Agent, or Firm* — James J. DeCarlo; Greenberg Traurig, LLP

(57) ABSTRACT

The disclosure discloses a method for adjusting distribution of partitioned data. Access frequency information of to-be-processed partitioned data is acquired when an adjustment time corresponding to the to-be-processed partitioned data has arrived; revenue data of each of data centers corresponding to the partitioned data is then determined according to the access frequency information and a preset revenue function; and finally, optimal distribution information is determined according to the revenue data of each of the data centers and a quantity of copies, and a position of each of the
(Continued)

copies in each of the data centers is adjusted according to the optimal distribution information. Therefore, without even having to provide additional memory or hard disk for storage, this disclosure dynamically optimizes the distribution status of the partitioned data according to access frequencies and characteristics of the partitioned data, thus reducing transmission bandwidth requirements among data centers.

20 Claims, 3 Drawing Sheets

(51) Int. Cl.
*G06F 16/182* (2019.01)
*G06F 16/27* (2019.01)
*G06F 16/11* (2019.01)

(58) Field of Classification Search
USPC .................. 711/170, 112, 117, 114; 713/320; 707/666, 652, 713
See application file for complete search history.

(56) References Cited

U.S. PATENT DOCUMENTS

| | | | |
|---|---|---|---|
| 7,383,381 B1* | 6/2008 | Faulkner | G06F 3/0607 |
| | | | 711/114 |
| 7,609,619 B2 | 10/2009 | Naseh et al. | |
| 7,710,865 B2 | 5/2010 | Naseh et al. | |
| 7,810,097 B2 | 10/2010 | Mayo et al. | |
| 7,827,147 B1* | 11/2010 | D'Hoye | G06F 16/134 |
| | | | 707/652 |
| 8,104,041 B2 | 1/2012 | Belady et al. | |
| 8,243,588 B2 | 8/2012 | Naseh et al. | |
| 9,128,766 B1* | 9/2015 | Herington | G06F 9/5094 |
| 9,141,646 B1 | 9/2015 | Shatdal | |
| 9,374,418 B2 | 6/2016 | Calo et al. | |
| 9,519,517 B2* | 12/2016 | Dalgas | G06F 9/50 |
| 2003/0196083 A1 | 10/2003 | Grawrock et al. | |
| 2008/0155537 A1 | 6/2008 | Dinda et al. | |
| 2010/0138677 A1* | 6/2010 | Pagan | G06F 3/0649 |
| | | | 713/320 |
| 2011/0029840 A1 | 2/2011 | Ozzie et al. | |
| 2016/0155141 A1* | 6/2016 | Song | G06Q 30/0242 |
| | | | 705/14.41 |
| 2016/0171035 A1* | 6/2016 | Zimmerer | G06F 16/2477 |
| | | | 707/666 |

* cited by examiner

METHODS AND APPARATUSES FOR ADJUSTING THE DISTRIBUTION OF PARTITIONED DATA

CROSS-REFERENCES TO RELATED APPLICATIONS

This application claims the benefit of priority of Chinese Application No. 201511024615.9, titled "METHOD FOR ADJUSTING DATA FRAGMENT DISTRIBUTION, AND DATA SERVER," filed on Dec. 30, 2015 and Int'l Appl. No. PCT/CN16/110238, titled "METHOD FOR ADJUSTING DATA FRAGMENT DISTRIBUTION, AND DATA SERVER," filed on Dec. 16, 2016, both of which are hereby incorporated by reference in their entirety.

BACKGROUND

Technical Field

The disclosure relates to the field of communication technology, and in particular, to methods and apparatuses for adjusting the distribution of partitioned data.

Description of the Related Art

In the environment of cloud computing and big data processing, a distributed file system is used as the bottom layer to provide an extendable storage service capability which is nearly unlimited to services executing at an upper layer. However, as scales of data centers are increasing and global deployment becomes a common practice, there are increasingly more offline incidents happening in data centers due to various physical problems (e.g., an optical fiber being damaged, fires, and so on). A severe service availability problem occurs once the data centers are offline.

A common method in the industry is distributing multiple copies of data into multiple data centers within a certain region, so as to improve the availability and continuity of data services. The service availability is improved by means of data redundancy among data centers. A data operator uses the technical solutions of having data distributed across data centers, such that even when data centers go offline, some of the data operator's services can still continue.

When data is distributed in multiple data centers ("DCs"), there will be data reading and writing processes across DCs. For example, a user might have to operate by reading and writing data across DCs, or a file system might need to perform data replication by accessing an external machine due to a software/hardware failure. The situation described earlier poses higher requirements for network connection and bandwidth across DCs. In the existing technical solution, a data operator generally builds data centers and a network by itself to ensure that sufficient network bandwidth can be provided among the data centers. However, network cables among the data centers need to be rented. Therefore, the costs are high, and sufficient bandwidth cannot be guaranteed.

At present, one solution is to add a layer of cache within each data center to avoid, to the greatest extent possible, reading across data centers, so as to solve the above problems. This method can effectively avoid network traffic caused by data reading across data centers. However, cached data is stored in a memory, which has a smaller storage capacity when compared with that of a magnetic disk memory (TB vs GB). The cache effect will therefore be reduced as the data volume increases. Moreover, if a cache system stores the cache to a hard disk, it occupies the available input/output (TO) capability of the user data. Further, it is harder to have the cache work with a file system at the bottom layer. For example, any modification made to data of a certain file will cause the whole cached version of the file invalid, thus affecting the efficiency of using the cache.

As can be seen from the above, the optimization of data distribution to save bandwidth of network access has become a technical problem that urgently needs to be addressed by those skilled in the art.

SUMMARY

The disclosure provides a method for adjusting distribution of partitioned data, so as to maximize the performance of data access while reducing the bandwidth requirements. The method is applied to a distributed file storage system having a plurality of data centers and a plurality of copies of to-be-processed partitioned data are stored in one or more of the data centers in the distributed file storage system, the method comprising: acquiring access frequency information of the to-be-processed partitioned data when an adjustment time corresponding to the to-be-processed partitioned data has arrived; determining revenue data of each of the data centers corresponding to the partitioned data according to the access frequency information and a preset revenue function; generating optimal distribution information according to the revenue data of each of the data centers and a quantity of the copies; and adjusting a position of each of the copies in each of the data centers according to the optimal distribution information.

In one embodiment, the acquiring access frequency information of the to-be-processed partitioned data when an adjustment time corresponding to the to-be-processed partitioned data has arrived comprises: acquiring sub-access frequency information reported by each of the data centers within a preset time period when a current time is determined to be the adjustment time according to the time period; or, acquire sub-access frequency information reported by each of the data centers within a preset time period when receiving an adjustment trigger message.

In one embodiment, the access frequency information comprises sub-access frequency information of the to-be-processed partitioned data in each of the data centers, and the sub-access frequency information comprises at least a size of the partitioned data, a number of access times that the partitioned data is accessed from a data center corresponding to the sub-access frequency information, data traffic of the partitioned data generated from the data center, and an average bandwidth across machine rooms.

In one embodiment, the revenue data is proportional to the number of access times, the data traffic, and the average bandwidth across machine rooms, and is inversely proportional to the size of the partitioned data.

In one embodiment, the generating optimal distribution information according to the revenue data of each of the data centers and a quantity of the copies comprises: arranging the data centers sequentially in a descending order of the revenue data; and acquiring identifiers having the same quantity as that of the ranked data centers, and using the acquired identifiers as the optimal distribution information.

In one embodiment, the adjusting a position of each of the copies in each of the data centers according to the optimal distribution information comprises: acquiring real-time distribution information of the partitioned data, the real-time distribution information comprising identifiers of data centers where the copies are currently located; determining whether the real-time distribution information is consistent with the optimal distribution information; and generating a data replication task according to identifiers found to be different between the real-time distribution information and the optimal distribution information if the real-time distribution information is inconsistent with the optimal distribution information, so as to store the copies to the data centers corresponding to the identifiers in the optimal distribution information.

In one embodiment, the method further comprises: adding one to the number of access times before the data center returns to a client a copy corresponding to partitioned data requested by the client; and adding the data volume of the copy to the data traffic before the data center returns to the client the copy corresponding to the partitioned data requested by the client.

In one embodiment, the method further comprises: acquiring to-be-written partitioned data included in a data writing request when receiving the data writing request sent by a user through the client, and determining whether the data writing request includes writing option information; determining data centers for allocating the to-be-written partitioned data according to distribution information specified by the user if the data writing request includes writing option information of cross-data center distribution, and returning a determination result to the client, such that the client writes the to-be-written partitioned data according to the determination result; and determining a data center for allocating the to-be-written partitioned data according to an identifier of the data center where the client is located and is included in the data writing request if the data writing request includes default writing option information or does not include any writing option information, and returning a determination result to the client, such that the client writes the to-be-written partitioned data according to the determination result.

In one embodiment, the method further comprises: returning to the client distribution information of partitioned data corresponding to a data reading request when receiving the data reading request sent by the user through the client, such that the client selects, according to the distribution information, partitioned data corresponding to the data center where the client is located and reads the partitioned data.

Accordingly, the disclosure further provides a device for adjusting distribution of partitioned data, wherein the device is applied to a distributed file storage system having a plurality of data centers and a plurality of copies of the to-be-processed partitioned data are stored in one or more of the data centers in the distributed file storage system, the device comprising: an acquisition module, configured to acquire access frequency information of the to-be-processed partitioned data when an adjustment time corresponding to the to-be-processed partitioned data has arrived; a determination module, configured to determine revenue data of each of the data centers corresponding to the partitioned data according to the access frequency information and a preset revenue function; a generation module, configured to generate optimal distribution information according to the revenue data of each of the data centers and a quantity of the copies; and an adjustment module, configured to adjust a position for each of the copies in each of the data centers according to the optimal distribution information.

In one embodiment, the acquisition module is configured to: acquire sub-access frequency information reported by each of the data centers within a preset time period when a current time is determined to be the adjustment time according to the time period; or, acquire sub-access frequency information reported by each of the data centers within a preset time period when receiving an adjustment trigger message.

In one embodiment, the access frequency information comprises sub-access frequency information of the to-be-processed partitioned data in each of the data centers, and the sub-access frequency information comprises at least a size of the partitioned data, a number of access times that the partitioned data is accessed from a data center corresponding to the sub-access frequency information, data traffic of the partitioned data generated from the data center, and an average bandwidth across machine rooms.

In one embodiment, the revenue data is proportional to the number of access times, the data traffic, and the average bandwidth across machine rooms, and is inversely proportional to the size of the partitioned data.

In one embodiment, the generation module further comprises: an arrangement sub-module, configured to arrange the data centers sequentially in a descending order of the revenue data; and a processing sub-module, configured to acquire identifiers having the same quantity as that of the ranked data centers, and use the acquired identifiers as the optimal distribution information.

In one embodiment, the generation module further comprises: an acquisition sub-module, configured to acquire real-time distribution information of the partitioned data, the real-time distribution information consisting of identifiers of data centers where the copies are currently located; a determination sub-module, configured to determine whether the real-time distribution information is consistent with the optimal distribution information, generate a data replication task according to identifiers found to be different between the real-time distribution information and the optimal distribution information if the real-time distribution information is inconsistent with the optimal distribution information, so as to store the copies to the data centers corresponding to the identifiers in the optimal distribution information.

In one embodiment, the device further comprises: a counting module, configured to add one to the number of access times before the data center returns to a client a copy corresponding to partitioned data requested by the client; and a measuring module, configured to add the data volume of the copy to the data traffic before the data center returns to the client the copy corresponding to the partitioned data requested by the client.

In one embodiment, the device further comprises: a writing module, configured to acquire to-be-written partitioned data included in a data writing request when receiving the data writing request sent by a user through the client, and determine whether the data writing request includes writing option information; the writing module determines data centers for allocating the to-be-written partitioned data according to distribution information specified by the user if the data writing request includes writing option information of cross-data center distribution, and returns a determination result to the client, such that the client writes the to-be-written partitioned data according to the determination result; and the writing module determines a data center for allocating the to-be-written partitioned data according to an identifier of the data center where the client is located and is included in the data writing request if the data writing request includes default writing option information or does not include any writing option information, and returns a determination result to the client, such that the client writes the to-be-written partitioned data according to the determination result.

In one embodiment, the device further comprises: a reading module, configured to return to the client distribution information of partitioned data corresponding to a data reading request when receiving the data reading request sent by the user through the client, such that the client selects, according to the distribution information, partitioned data corresponding to the data center where the client is located and reads the partitioned data.

Accordingly, another aspect of the disclosure further provides a distributed file storage system, comprising at least one client, wherein the file storage system further comprises: one or a plurality of data centers, the data centers being configured to store a plurality of copies of to-be-processed partitioned data; and a device for adjusting distribution of partitioned data, the device being configured to acquire access frequency information of the to-be-processed partitioned data when an adjustment time corresponding to the to-be-processed partitioned data has arrived; determine revenue data of each of the data centers corresponding to the partitioned data according to the access frequency information and a preset revenue function; generate optimal distribution information according to the revenue data of each of the data centers and a quantity of the copies; and adjust a position for each of the copies in each of the data centers according to the optimal distribution information.

As can be seen from the above that by applying the technical solution of the disclosure, access frequency information of to-be-processed partitioned data can be acquired when an adjustment time corresponding to the to-be-processed partitioned data has arrived; revenue data of each of data centers corresponding to the partitioned data can then be determined according to the access frequency information and a preset revenue function; and finally, optimal distribution information can be determined according to the revenue data of each of the data centers and a quantity of copies, and a position of each of the copies in each of the data centers can be adjusted according to the optimal distribution information. Therefore, without even having to provide additional memory or hard disk for storage, this disclosure dynamically optimizes the distribution status of the partitioned data according to access frequencies and characteristics of the partitioned data, thus reducing transmission bandwidth requirements among data centers.

DETAILED DESCRIPTION OF THE EMBODIMENTS

As described in the background, limiting the data traffic across machine rooms by increasing bandwidth among machine rooms increases costs dramatically. On the other hand, having a cache within each machine room to reduce data traffic across machine rooms is limited by the memory and the overall storage efficiency is also reduced. Therefore, data in a machine room is partitioned in the disclosed embodiments. Each piece of partitioned data may also be referred to as a data block. As a physical data recording method, the partitioned data is a group of records arranged logically and consecutively. Each record comprises multiple copies. A copy of a partitioned data is a data unit for transmission between a data center and an input/output device or another data center. Network traffic across data centers can be optimized by dynamically adjusting data distribution regarding partitioned data in different machine rooms. As such, the data access performance can be optimized while reducing the bandwidth requirements.

Figure 1:
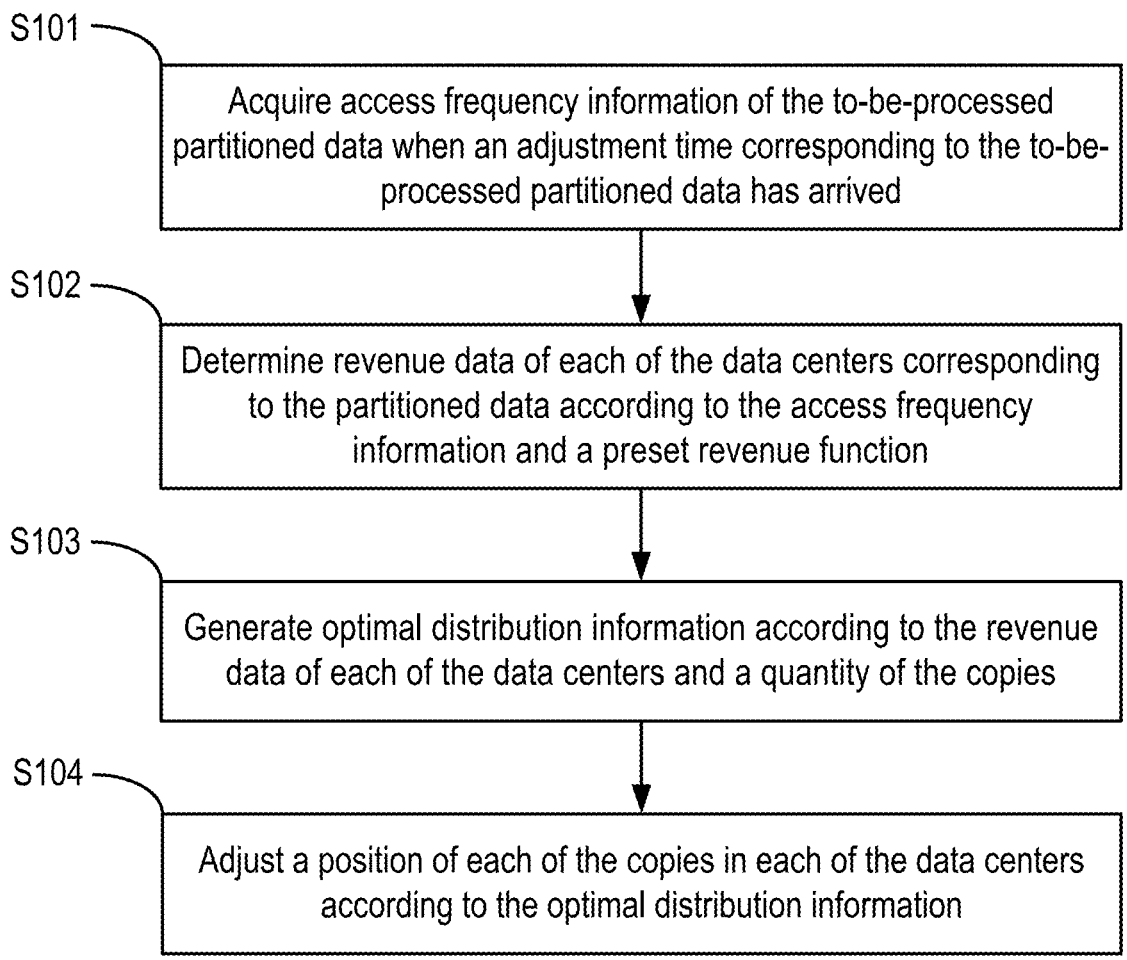
FIG. 1 is a flow diagram illustrating a method for adjusting distribution of partitioned data according to some embodiments of the disclosure.

FIG. 1 is a flow diagram illustrating a method for adjusting distribution of partitioned data according to some embodiments of the disclosure.

The disclosure aims to optimize distribution of existing partitioned data in a plurality of data centers according to users' access statuses. The method is therefore applied to a distributed file system including a plurality of data centers. Multiple copies of to-be-processed partitioned data are stored in one or more data centers (i.e., all the multiple copies can be stored in one of the multiple data centers, or can be stored in the current data centers) of the distributed file system. The method includes the following steps.

S101: Acquire access frequency information of the to-be-processed partitioned data when an adjustment time corresponding to the to-be-processed partitioned data has arrived.

The access frequency information comprises sub-access frequency information of the to-be-processed partitioned data in each of the data centers, and the sub-access frequency information comprises at least a size of the partitioned data, a number of access times that the partitioned data is accessed from a data center corresponding to the sub-access frequency information, data traffic of the partitioned data generated from the data center, and an average bandwidth across machine rooms.

In one embodiment of the disclosure, the adjustment on the partitioned data can be set to be executed automatically by the system or triggered manually. In the case where the adjustment is triggered automatically by the system, when the current time is determined to be the adjustment time according to a preset time period, sub-access frequency information reported by each of the data centers within the time period is acquired. When the adjustment is triggered manually, sub-access frequency information reported by each of the data centers within the preset time period is acquired when an adjustment trigger message is received.

Regarding the technical solution of the disclosure, it needs to be determined whether the copies of the partitioned data are suitable to be stored in the data center. Therefore, the access frequency information comprises sub-access frequency information of the to-be-processed partitioned data in each of the data centers. Each of the data centers needs to record the size of the partitioned data and the average bandwidth across machine rooms. Further, each data center collects the number of access times the partitioned data is accessed in each period and data traffic generated by the partitioned data from the data center, thus providing the basis for the subsequent determining of the revenue.

It should be noted that, as variables in the sub-access frequency information, the number of access times needs to be added by one before the data center returns to a client a copy corresponding to a partitioned data requested by the client; and the data traffic needs to be added with the data volume of the copy before the data center returns to the client the copy corresponding to the partitioned data requested by the client.

Writing and reading processes of partitioned data are inevitable when data distribution is adjusted dynamically in the disclosure. Therefore, traffic generated during reading and writing of the partitioned data across data centers can be effectively reduced if the reading and writing processes for the partitioned data are optimized.

In the writing process of the partitioned data, a default method is that all the partitioned data are placed in a data center where the client is located, so as to avoid traffic generated during writing of the partitioned data across data centers. However, if a writing option specified by a user is to write data across data centers, partitioned data are written according to the writing option specified by the user; and traffic across data centers may be generated in this case. Therefore, one embodiment of the disclosure provides corresponding method steps for the writing process of the partitioned data, which are specifically as follows:

a) acquiring to-be-written partitioned data included in a data writing request when receiving the data writing request sent by a user through the client, and determining whether the data writing request includes writing option information;

b) determining data centers for allocating the to-be-written partitioned data according to distribution information specified by the user if the data writing request includes writing option information of cross-data center distribution, and returning a determination result to the client, such that the client writes the to-be-written partitioned data according to the determination result; and c) determining a data center for allocating the to-be-written partitioned data according to an identifier of the data center where the client is located and is included in the data writing request if the data writing request includes default writing option information or does not include any writing option information, and returning a determination result to the client, such that the client writes the to-be-written partitioned data according to the determination result.

In the reading process of partitioned data, only partitioned data placed in the data center where the client is located will be read so as to avoid traffic generated when reading partitioned data across data centers. Therefore, the implementation of the disclosure provides a corresponding method step for the reading process of the partitioned data, which is as follows:

a) returning, to the client, distribution information of partitioned data corresponding to a data reading request when receiving the data reading request sent by the user through the client, such that the client selects, according to the distribution information, partitioned data corresponding to the data center where the client is located and reads the partitioned data.

In the implementation of the disclosure, the reading and writing processes of the partitioned data are optimized by using the above manners, such that the traffic generated during reading and writing of the partitioned data across data centers is greatly reduced, thereby reducing the bandwidth requirements.

Figure 2:
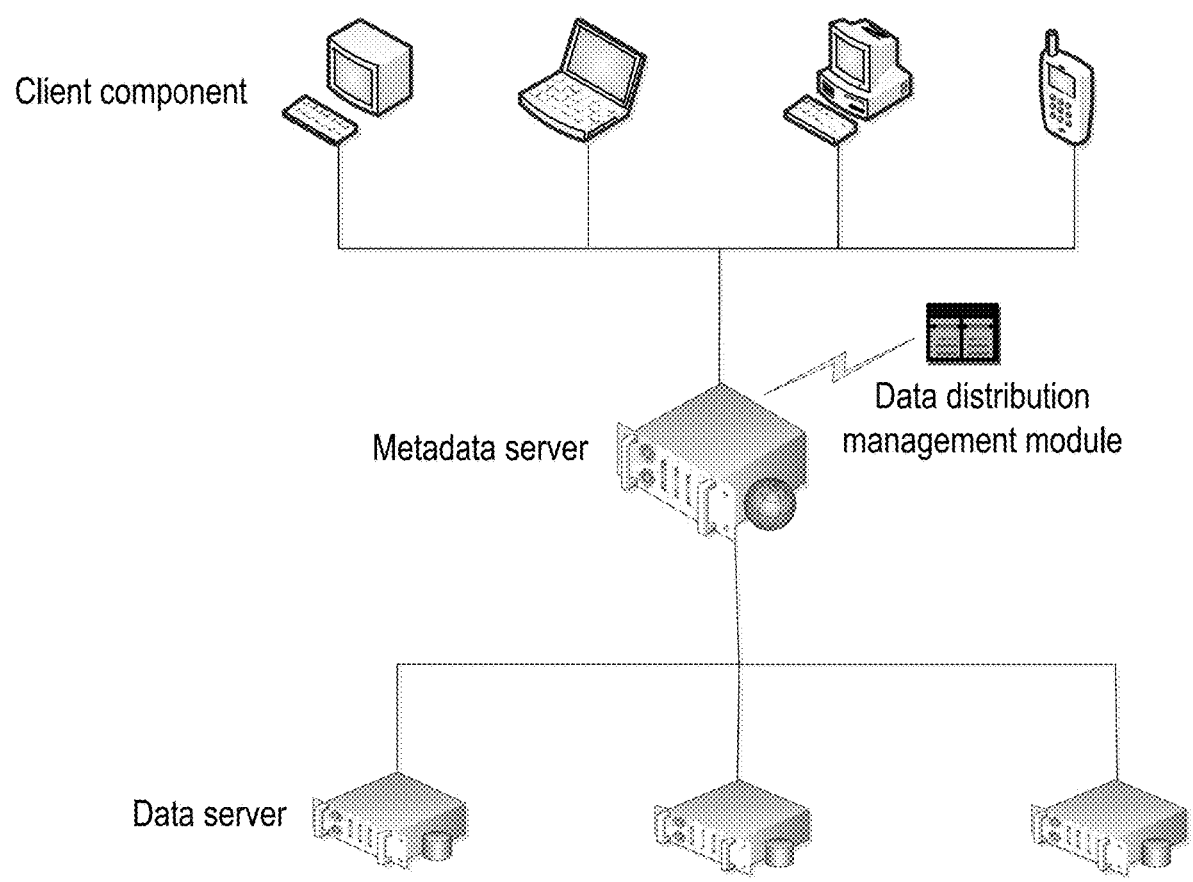
FIG. 2 is a block diagram illustrating a distributed storage system according to some embodiments of the disclosure.

To clearly illustrate the technical solution of the disclosure, as shown in FIG. 2, one embodiment of the disclosure provides a distributed storage system having a master server and a client. The client comprises one or more client components. The master server includes multiple modules such as a data server, a metadata server, and a data distribution management module. Specifically, each of the modules is described as follows:

Client Component: the client component acquires position information of partitioned data from the master server when a file is opened; and selects the closest DC for accessing the data (the same DC is preferred to an external DC). During data writing, by default, all the partitioned data are always placed in the data center where a writer is located, to avoid traffic generated because of data writing across data centers.

Data Server: the data server manages data and access frequency information of copies of a file, and provides reading and writing operations for the managed copies. The data server reports the frequency information to the metadata server through a periodical reporting mechanism. Because the data has multiple copies, multiple data servers will be reporting access data of the same partitioned data.

Metadata Server: the metadata server records the position information of the partitioned data of the file, and collects frequency information of a partitioned data accessed from any DC (accumulated within a period of time, such as one day).

Data Distribution Management Module: the data distribution management module is a component provided on the metadata server. The component periodically (e.g., every day) calculates the position information and access frequency information of all the partitioned data, and calculates a revenue of redistribution of the data. If the revenue exceeds a weight, a partitioned data position adjustment request is triggered asynchronously to implement the data distribution adjustment.

Based on the foregoing modules, the data writing process and the data reading process before the partitioned data adjustment are as follows.

(1) Data Writing Process

Step a): A client program C receives a data writing request in DC1. C sends a request to the master server for the positions of partitioned data; the request including the name (DC1) of the data center where C is located. By default, the master server will allocate all the partitioned data to DC1. As such, subsequent writing will not generate traffic across DCs. If the user specifies that the writing option is to be distributed across DCs, the master will allocate the partitioned data according to the distribution specified by the user as much as possible. In this case, it is possible that the subsequent writing will generate traffic across DCs.

Step b): The client program implements data writing based on the partitioned data allocated by the master server.

(2) Data Reading Process

Step a): A client program C applies to a master server for opening a file (f) to perform data reading.

Step b) The master server returns to C positions of partitioned data.

Step c): C preferentially selects partitioned data locating in the same data center, and directly connects to a corresponding data server to perform a data reading operation. C sends to a data server a request including the name (DC1) of a DC where C is located, and specifies a piece of partitioned data d to be accessed and read.

Step d): The data server adds 1 (+1) to the access frequency of the corresponding partitioned data (d) before returning the data to C, and adds the requested data to the corresponding access data volume.

Step e): C obtains the data returned by the data server, and returns the data to the user.

S102: Determine revenue data of each of the data centers corresponding to the partitioned data according to the access frequency information and a preset revenue function.

The revenue data is proportional to the number of access times, the data traffic, and the average bandwidth across machine rooms, and is inversely proportional to the size of the partitioned data.

In one embodiment of the disclosure, a reference formula of the revenue function is as follows:

$$f(d, dc) = \frac{aA(d, dc) + bB(d, dc)}{2} * \frac{C}{S(d)}$$

wherein d corresponds to a specific piece of partitioned data, S(d) denotes the size (MB) of the data. A(d, dc) denotes the number of times the partitioned data d is accessed from a machine room dc, and B(d, dc) denotes data traffic generated for the partitioned data d from the machine room dc. C denotes an average bandwidth that can be acquired by each CS and is obtained by dividing the bandwidth (MB) across machine rooms by the quantity of servers in the whole cluster.

By using the foregoing revenue function, a calculation result ƒ(d, dc) is the revenue that can be obtained when the partitioned data d is distributed to the dc. In a subsequent process, all the partitioned data d can be calculated by using the revenue function. Moreover, calculation for all the dcs (including the dc where the data is located) may also be performed. Calculation results are ranked to ensure that a machine room having the highest revenue has partitioned data, and the number of data is proportional to the data access frequency.

It should be noted that the foregoing formula is merely one solution proposed in the specific embodiment of the disclosure. However, those skilled in the art can also modify or transform the revenue function in the premise that the revenue data is ensured to be proportional to the number of access times, the data traffic, and the average bandwidth across machine rooms, and is also ensured to be inversely proportional to the size of the partitioned data. These modifications or transformations all fall within the protection scope of the disclosure.

S103: Generate optimal distribution information according to the revenue data of each of the data centers and a quantity of the copies.

For copies of the partitioned data to be evenly distributed to each data center and to consider revenue data of each of the data centers at the same time, in one embodiment of the disclosure, the data centers are sequentially arranged according to a descending order of the revenue data. Identifiers having the same quantity as that of the ranked data centers are acquired, and the acquired identifiers are used as the optimal distribution information.

S104: Adjust a position for each of the copies in each of the data centers according to the optimal distribution information.

Specifically, in one embodiment of the disclosure, real-time distribution information of the partitioned data is acquired first. It should be noted that, the original distribution information comprises the identifiers of data centers where the copies are currently located. Therefore, it can be determined subsequently whether the real-time distribution information is consistent with the optimal distribution information. A data replication task is generated according to identifiers found to be different between the real-time distribution information and the optimal distribution information if the real-time distribution information is inconsistent with the optimal distribution information. The copies may then be stored into the data centers corresponding to the identifiers in the optimal distribution information.

We now use the distributed storage system in S101 as an example. The adjustment process for the partitioned data in the specific embodiment is as follows:

Step a): The data server periodically reports to the master server the access frequency information of the partitioned data.

Step b): The master server assembles and summarizes the information according to the partitioned data.

Step c): The data distribution management module of the master server recalculates the distribution revenue function ƒ(d, DC1) of all the partitioned data periodically (every day) or when being triggered manually by a system administrator. Reference can be made to the foregoing formula for the calculation process. The distribution data for the partitioned data is updated according to the calculation result. For example, the distribution of the partitioned data d before the calculation is (DC1, DC1, DC1), and is adjusted to (DC1, dc2, dc2) after the calculation.

Step d): The data distribution management module scans data distribution status in the background. A low-priority data replication task will be initiated to reorganize the data layout if the data distribution management module discovers that the current data distribution is inconsistent with the ideal distribution (after being adjusted in step C).

Step e): The client preferentially accesses data in this machine room in the subsequent reading.

Figure 3:
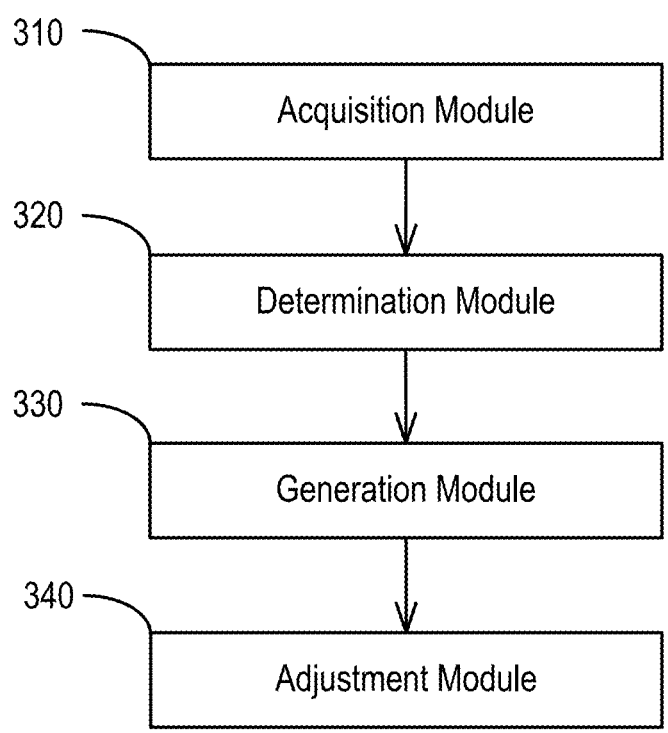
FIG. 3 is a block diagram illustrating a device for adjusting distribution of partitioned data according to some embodiments of the disclosure.

To achieve the foregoing technical objective, the disclosure further provides a device for adjusting distribution of partitioned data illustrated in FIG. 3, wherein the device is applied to a distributed file system having a plurality of data centers, a plurality of copies of the to-be-processed partitioned data are stored in one or more of the data centers in the distributed file system, the device comprising: an acquisition module 310, configured to acquire access frequency information of the to-be-processed partitioned data when an adjustment time corresponding to the to-be-processed partitioned data has arrived; a determination module 320, configured to determine revenue data of each of the data centers corresponding to the partitioned data according to the access frequency information and a preset revenue function; a generation module 330, configured to generate optimal distribution information according to the revenue data of each of the data centers and a quantity of the copies; and an adjustment module 340, configured to adjust a position for each of the copies in each of the data centers according to the optimal distribution information.

In a specific application scenario, the acquisition module is configured to: acquire sub-access frequency information reported by each of the data centers within a preset time period when a current time is determined to be the adjustment time according to the time period; or, acquire sub-access frequency information reported by each of the data centers within a preset time period when receiving an adjustment trigger message.

In a specific application scenario, the access frequency information comprises sub-access frequency information of the to-be-processed partitioned data in each of the data centers, and the sub-access frequency information comprises at least a size of the partitioned data, a number of access times that the partitioned data is accessed from a data center corresponding to the sub-access frequency information, data traffic of the partitioned data generated from the data center, and an average bandwidth across machine rooms.

In a specific application scenario, the revenue data is proportional to the number of access times, the data traffic, and the average bandwidth across machine rooms, and is inversely proportional to the size of the partitioned data.

In a specific application scenario, the generation module further includes: an arrangement sub-module, configured to arrange the data centers sequentially in a descending order of the revenue data; and a processing sub-module, configured to acquire identifiers having the same quantity as that of the ranked data centers, and use the acquired identifiers as the optimal distribution information.

In a specific application scenario, the generation module further includes: an acquisition sub-module, configured to acquire real-time distribution information of the partitioned data, the original distribution information consisting of identifiers of data centers where the copies are currently located; and a determination sub-module, configured to determine whether the real-time distribution information is consistent with the optimal distribution information, generate a data replication task according to identifiers found to be different between the real-time distribution information and the optimal distribution information if the real-time distribution information is inconsistent with the optimal distribution information, so as to store the copies to the data centers corresponding to the identifiers in the optimal distribution information.

In a specific application scenario, the device further includes: a counting module, configured to add one to the number of access times before the data center returns to a client a copy corresponding to partitioned data requested by the client; and a measuring module, configured to add the data volume of the copy to the data traffic before the data center returns to the client the copy corresponding to the partitioned data requested by the client.

In a specific application scenario, the device further includes: a writing module, configured to acquire to-be-written partitioned data included in a data writing request when receiving the data writing request sent by a user through the client, and determine whether the data writing request includes writing option information; the writing module determines data centers for allocating the to-be-written partitioned data according to distribution information specified by the user if the data writing request includes writing option information of cross-data center distribution, and returns a determination result to the client, such that the client writes the to-be-written partitioned data according to the determination result; and the writing module determines a data center for allocating the to-be-written partitioned data according to an identifier of the data center where the client is located and is included in the data writing request if the data writing request includes default writing option information or does not include any writing option information, and returns a determination result to the client, such that the client writes the to-be-written partitioned data according to the determination result.

In a specific application scenario, the device further includes: a reading module, configured to return to the client distribution information of partitioned data corresponding to a data reading request when receiving the data reading request sent by the user through the client, such that the client selects, according to the distribution information, partitioned data corresponding to the data center where the client is located and reads the partitioned data.

Another aspect of the disclosure further provides a distributed file storage system, including at least one client, wherein the file storage system further includes: one or a plurality of data centers, the data centers being configured to store a plurality of copies of to-be-processed partitioned data; and a device for adjusting distribution of partitioned data, the device being configured to acquire access frequency information of the to-be-processed partitioned data when an adjustment time corresponding to the to-be-processed partitioned data has arrived; determine revenue data of each of the data centers corresponding to the partitioned data according to the access frequency information and a preset revenue function; generate optimal distribution information according to the revenue data of each of the data centers and a quantity of the copies; and adjust a position for each of the copies in each of the data centers according to the optimal distribution information.

After applying the foregoing solution for storing the partitioned data, the frequency information stored in a data server only needs to be stored in the memory; and corresponding data is cleared if for any reason the data server crashes. Crash due to exceptions is a small-probability event, which has a minor influence on the accuracy of the access frequency in the environment of the whole cluster. Moreover, a reasonable layout can be restored automatically along with adjustment of the partitioned data distribution in the next period.

According to the description of the foregoing implementations, those skilled in the art can clearly understand that the disclosure can be implemented by hardware, or implemented by software plus a necessary universal hardware platform. Based on such understanding, the technical solutions of the disclosure may be implemented in the form of a software product. The software product may be stored in a non-volatile storage medium (which may be a CD-ROM, a USB drive, a mobile hard disk, memory, and the like) including several instructions for instructing a computer device (which may be a personal computer, a server, a network device, or the like), via a processor, to perform the method described in each implementation scenario of the disclosure.

Those skilled in the art can understand that the accompanying drawings are schematic diagrams of exemplary embodiments, and modules or processes in the accompanying drawings are not necessarily mandatory for implementing the disclosure.

Those skilled in the art can understand that the modules in the apparatus in the implementation scenario can be distributed in the apparatus of the implementation scenario according to the description of the implementation scenario; or the modules may be changed accordingly to be located in one or more apparatuses in a scenario different from this implementation scenario. The modules of the foregoing implementation scenario may be combined into one module, or further divided into multiple sub-modules.

The sequence numbers of the disclosure are merely for the convenience of description, they do not imply the preference among the implementation scenarios.

Those disclosed above are merely several specific implementation scenarios of the disclosure. However, the disclosure is not limited thereto, and any variations that can be conceived of by those skilled in the art shall fall within the scope of the disclosure.

What is claimed is:
1. A method comprising:
acquiring, by a storage system, access frequency information of partitioned data when an adjustment time corresponding to the partitioned data has occurred;
determining, by the storage system, revenue data for each of a plurality of data centers corresponding to the partitioned data according to the access frequency information and a preset revenue function, the preset revenue function generating revenue data based on a number of past accesses of the partitioned data for a given data center and data traffic that includes the partitioned data for the given data center;

generating, by the storage system, optimal distribution information according to the revenue data of each of the data centers and a quantity of copies of the partitioned data; and adjusting, by the storage system, a position of each of the copies in each of the data centers according to the optimal distribution information.

2. The method of claim 1, the acquiring access frequency information of the partitioned data when an adjustment time corresponding to the partitioned data has arrived comprising one of:

acquiring, by the storage system, sub-access frequency information reported by each of the data centers within a preset time period when a current time is determined to be the adjustment time; and acquiring, by the storage system, sub-access frequency information reported by each of the data centers within a preset time period when receiving an adjustment trigger message.

3. The method of claim 1, the access frequency information comprising sub-access frequency information of the partitioned data in each of the data centers, the sub-access frequency information comprising at least a size of the partitioned data, a number of access times that the partitioned data is accessed from a data center corresponding to the sub-access frequency information, data traffic of the partitioned data generated from the data center, and an average bandwidth across machine rooms.

4. The method of claim 1, the revenue data proportional to the number of access times, the data traffic, and the average bandwidth across machine rooms, and inversely proportional to the size of the partitioned data.

5. The method of claim 1, the generating the optimal distribution information according to the revenue data of each of the data centers and a quantity of copies comprising:

ranking, by the storage system, the data centers sequentially in a descending order using the revenue data;

acquiring, by the storage system, identifiers having the same quantity as that of the ranked data centers; and using, by the storage system, the acquired identifiers as the optimal distribution information.

6. The method of claim 5, the adjusting a position of each of the copies in each of the data centers according to the optimal distribution information comprising:

acquiring, by the storage system, real-time distribution information of the partitioned data, the real-time distribution information comprising identifiers of data centers where the copies of the partitioned data are located;

determining, by the storage system, whether the real-time distribution information is consistent with the optimal distribution information;

generating, by the storage system, a data replication task using identifiers found to be different between the real-time distribution information and the optimal distribution information if the real-time distribution information is inconsistent with the optimal distribution information; and storing, by the storage system via the data replication task, the copies of the partitioned data to the data centers corresponding to the identifiers in the optimal distribution information.

7. The method of claim 6, further comprising:

adding, by the storage system, one to the number of access times before the data center returns a copy corresponding to partitioned data to a client; and adding, by the storage system, the data volume of the copy to the data traffic before the data center returns the copy corresponding to the partitioned data to the client.

8. The method of claim 7, further comprising:

acquiring, by the storage system, to-be-written partitioned data included in a data writing request sent by a client and determining whether the data writing request includes writing option information;

determining, by the storage system, data centers for allocating the to-be-written partitioned data according to distribution information specified by the user if the data writing request includes writing option information of cross-data center distribution and returning a determination result to the client, causing the client to write the to-be-written partitioned data according to the determination result; and determining, by the storage system, a data center for allocating the to-be-written partitioned data according to an identifier of the data center where the client is located and is included in the data writing request if the data writing request includes default writing option information or does not include any writing option information and returning a determination result to the client, such that the client writes the to-be-written partitioned data according to the determination result.

9. The method of claim 7, further comprising:

returning, by the storage system to the client, distribution information of partitioned data corresponding to a data reading request when receiving the data reading request sent by the client, causing the client to select, according to the distribution information, partitioned data corresponding to the data center where the client is located and reads the partitioned data.

10. A distributed file storage system comprising:

a plurality of data centers, each data center configured to store a plurality of copies of partitioned data; and a device for adjusting distribution of partitioned data, the device configured to:

acquire access frequency information of the partitioned data when an adjustment time corresponding to the partitioned data has arrived, determine revenue data for each of the data centers corresponding to the partitioned data according to the access frequency information and a preset revenue function, the preset revenue function generating revenue data based on a number of past accesses of the partitioned data for a given data center and data traffic that includes the partitioned data for the given data center generate optimal distribution information according to the revenue data of each of the data centers and a quantity of copies of the partitioned data, and adjust a position for each of the copies in each of the data centers according to the optimal distribution information.

11. The system of claim 10, the device for adjusting distribution of partitioned data further configured to:

acquire real-time distribution information of the partitioned data, the real-time distribution information comprising identifiers of data centers where the copies of the partitioned data are located;

determine whether the real-time distribution information is consistent with the optimal distribution information;

generate a data replication task using identifiers found to be different between the real-time distribution information and the optimal distribution information if the real-time distribution information is inconsistent with the optimal distribution information; and store, via the data replication task, the copies of the partitioned data to the data centers corresponding to the identifiers in the optimal distribution information.

12. A device comprising:
a processor; and
a storage medium for tangibly storing thereon program logic for execution by the processor, the stored program logic comprising:
  logic, executed by the processor, for acquiring access frequency information of partitioned data when an adjustment time corresponding to the partitioned data has occurred,
  logic, executed by the processor, for determining revenue data for each of a plurality of data centers corresponding to the partitioned data according to the access frequency information and a preset revenue function, the preset revenue function generating revenue data based on a number of past accesses of the partitioned data for a given data center and data traffic that includes the partitioned data for the given data center
  logic, executed by the processor, for generating optimal distribution information according to the revenue data of each of the data centers and a quantity of copies of the partitioned data, and
  logic, executed by the processor, for adjusting a position of each of the copies in each of the data centers according to the optimal distribution information.

13. The device of claim 12, the logic for acquiring access frequency information of the partitioned data when an adjustment time corresponding to the partitioned data has arrived comprising one of:
  logic, executed by the processor, for acquiring sub-access frequency information reported by each of the data centers within a preset time period when a current time is determined to be the adjustment time; and
  logic, executed by the processor, for acquiring sub-access frequency information reported by each of the data centers within a preset time period when receiving an adjustment trigger message.

14. The device of claim 12, the access frequency information comprising sub-access frequency information of the partitioned data in each of the data centers, the sub-access frequency information comprising at least a size of the partitioned data, a number of access times that the partitioned data is accessed from a data center corresponding to the sub-access frequency information, data traffic of the partitioned data generated from the data center, and an average bandwidth across machine rooms.

15. The device of claim 12, the revenue data proportional to the number of access times, the data traffic, and the average bandwidth across machine rooms, and inversely proportional to the size of the partitioned data.

16. The device of claim 12, the logic for generating the optimal distribution information according to the revenue data of each of the data centers and a quantity of copies comprising:
  logic, executed by the processor, for ranking the data centers sequentially in a descending order using the revenue data;
  logic, executed by the processor, for acquiring identifiers having the same quantity as that of the ranked data centers; and
  logic, executed by the processor, for using the acquired identifiers as the optimal distribution information.

17. The device of claim 16, the logic for adjusting a position of each of the copies in each of the data centers according to the optimal distribution information comprising:
  logic, executed by the processor, for acquiring real-time distribution information of the partitioned data, the real-time distribution information comprising identifiers of data centers where the copies of the partitioned data are located;
  logic, executed by the processor, for determining whether the real-time distribution information is consistent with the optimal distribution information; and
  logic, executed by the processor, for generating a data replication task using identifiers found to be different between the real-time distribution information and the optimal distribution information if the real-time distribution information is inconsistent with the optimal distribution information; and
  logic, executed by the processor, for storing, via the data replication task, the copies of the partitioned data to the data centers corresponding to the identifiers in the optimal distribution information.

18. The device of claim 17, the program logic further comprising:
  logic, executed by the processor, for adding one to the number of access times before the data center returns a copy corresponding to partitioned data to a client; and
  logic, executed by the processor, for adding the data volume of the copy to the data traffic before the data center returns the copy corresponding to the partitioned data to the client.

19. The device of claim 18, the program logic further comprising:
  logic, executed by the processor, for acquiring to-be-written partitioned data included in a data writing request sent by a client and determining whether the data writing request includes writing option information;
  logic, executed by the processor, for determining data centers for allocating the to-be-written partitioned data according to distribution information specified by the user if the data writing request includes writing option information of cross-data center distribution and returning a determination result to the client, causing the client to write the to-be-written partitioned data according to the determination result; and
  logic, executed by the processor, for determining a data center for allocating the to-be-written partitioned data according to an identifier of the data center where the client is located and is included in the data writing request if the data writing request includes default writing option information or does not include any writing option information and returning a determination result to the client, such that the client writes the to-be-written partitioned data according to the determination result.

20. The device of claim 18, the program logic further comprising:
  logic, executed by the processor, for returning, to the client, distribution information of partitioned data corresponding to a data reading request when receiving the data reading request sent by the client, causing the client to select, according to the distribution information, partitioned data corresponding to the data center where the client is located and reads the partitioned data.

\* \* \* \* \*